United States Patent [19]

Batlivala et al.

[11] Patent Number: 4,608,699
[45] Date of Patent: Aug. 26, 1986

[54] SIMULCAST TRANSMISSION SYSTEM

[75] Inventors: Percy P. Batlivala, Arlington Heights; Christopher N. Kurby, Elmhurst, both of Ill.

[73] Assignee: Motorola, Inc., Schaumburg, Ill.

[21] Appl. No.: 453,846

[22] Filed: Dec. 27, 1982

[51] Int. Cl.$^4$ ............................................. H04L 27/10
[52] U.S. Cl. .................................... 375/5; 375/45; 375/81
[58] Field of Search ................ 375/3, 5, 7, 8, 81, 375/45; 455/7, 31, 73, 78, 51, 52, 53, 56; 331/23

[56] References Cited

U.S. PATENT DOCUMENTS

| | | | |
|---|---|---|---|
| 2,094,113 | 9/1937 | Affel | 325/183 |
| 3,355,549 | 11/1963 | Alexander et al. | 375/3 |
| 3,525,945 | 8/1970 | Puente | 329/50 |
| 3,577,080 | 5/1971 | Cannalte | 325/183 |
| 3,697,690 | 9/1972 | Aaron et al. | 178/69 |
| 3,927,373 | 12/1975 | Janssens | 325/58 |
| 3,983,501 | 9/1976 | Lindstrum | 329/122 |
| 4,000,476 | 12/1976 | Walker et al. | 331/17 |
| 4,041,393 | 8/1977 | Reed | 375/5 |
| 4,061,974 | 12/1977 | Fletcher et al. | 325/58 |
| 4,077,016 | 2/1978 | Sanders et al. | 331/4 |
| 4,117,405 | 9/1978 | Martinez | 455/119 |
| 4,119,912 | 10/1978 | Turi Nagy et al. | 375/107 |
| 4,131,849 | 12/1978 | Freeburg et al. | 375/5 |
| 4,156,867 | 5/1979 | Bench et al. | 375/5 |
| 4,188,582 | 2/1980 | Cannalte et al. | 455/51 |
| 4,233,565 | 11/1980 | Chmura | 375/5 |
| 4,243,941 | 1/1981 | Zdunek | 329/50 |
| 4,255,814 | 3/1981 | Osborn | 455/51 |
| 4,317,220 | 2/1982 | Martin | 455/58 |
| 4,355,401 | 10/1982 | Ikoma et al. | 375/5 |
| 4,377,860 | 3/1983 | Godbole | 375/5 |
| 4,418,416 | 11/1983 | Lese et al. | 375/5 |
| 4,451,930 | 5/1984 | Chapman et al. | 455/51 |
| 4,481,489 | 11/1984 | Kurby | 375/120 |

Primary Examiner—Benedict V. Safourek
Assistant Examiner—Stephen Chin
Attorney, Agent, or Firm—James E. Jacobson, Jr.; Edward M. Roney; Donald B. Southard

[57] ABSTRACT

An improved simulcast transmission in which a signal transmitted by a master station provides a reference frequency signal, as well as a voice and data path, is described. The system can be configured such that a master station can transmit AFSK data and voice or FSK data and voice. In either case, the remote transmitter will retransmit FSK and voice.

11 Claims, 4 Drawing Figures

SIMULCAST TRANSMISSION SYSTEM

BACKGROUND OF THE INVENTION

1. Field of the Invention

This invention relates to the field of simulcast transmission systems and specifically to a simulcast transmission system wherein a transmitted signal is used to distribute audio as well as provide a reference to the remote transmitters of a simulcast system.

2. Description of the Prior Art

Simulcast transmission systems have been developed as a method for obtaining wide broadcast coverage in a large area with a diverse topology. Typically, these systems incorporate several transmitters which are placed a great distance from each other as determined by the constraints of a particular area. To achieve good quality audio reproduction in a simulcast transmission system, the transmitters of the simulcast system must be substantially exactly the same frequency. Any variation in the signals being transmitted in the system will result in various types of distortion in the signal delivered to a receiver. This requires that every transmitter in a simulcast system produce a signal of substantially identical frequency and substantially identical modulation.

The frequency and modulation characteristics of a simulcast transmitter can be relaxed somewhat if the system is used to distribute data. Modern data transmission and error correction techniques allow data to be recovered even though it may be slightly distorted.

Certain simulcast systems in the past have used high stability quartz crystal oscillators to control the transmitters' operating frequency and microwave modems and microwave systems have been used to distribute the audio signal. An alternate approach to a simulcast system is disclosed in U.S. Pat. No. 4,188,582, assigned to the same assignee as the present invention. The system as therein disclosed utilizes a reference oscillator driving a microwave transmitter. The signal from the microwave transmitter is then conveyed to a plurality of microwave receivers which drive lower frequency transmitters which are phase-locked to the microwave receivers, thus providing a plurality of transmitters which are operating at relatively the same frequency. These systems operate within generally acceptable specifications, but the described system is quite complex and expensive.

Simulcast transmission systems used for paging devices typically transmit a combination of audio and data signals. A paging transmission can consist of a binary address and a voice message. In simulcast transmission systems which utilize phase-locked loops for deriving a reference frequency, a disparity of ones and zeros in the digital FSK signal will cause a net DC component in the received signal which will drive the included voltage-controlled oscillator of the phase-locked loop off frequency. This condition prevents effective data transmission with presently known phase-locked loop simulcast transmission techniques.

For the foregoing and other shortcomings and problems, there has been a long-felt need to reduce the complexity and expense of a simulcast transmission system while maintaining the transmitters at less than the allowable frequency difference while allowing transmission of both audio and data signals.

SUMMARY OF THE INVENTION

Accordingly, it is an object of the present invention to provide a simulcast transmission system in which a transmitted signal provides a reference signal and an audio signal to the remote transmitters of the system.

It is yet a further object of this invention to provide a simulcast transmission system which remains substantially on-frequency in the presence of either audio or data signals.

It is yet a further object of this invention to provide a simulcast transmission system in which a master transmitter can transmit audio and AFSK data and the remote transmitter will retransmit audio and FSK data.

It is still another object of this invention to provide a simulcast transmission system in which a master transmitter can transmit audio and FSK data and the remote transmitter will retransmit audio and FSK data.

Briefly described, this invention contemplates an improved simulcast system in which a transmitted carrier signal is utilized as a reference signal for the phase locked loop receivers used at the remote sites including a phase locked loop which can be opened in the presence of AFSK data. The system utilizes a discriminator and modem to recover the baseband audio or data signals and a data detector to control the phase locked loop and audio path. The audio and data signals are then recombined and directly applied to the voltage controlled oscillator of the transmitter.

DETAILED DESCRIPTION OF THE DRAWINGS

Figure 1:
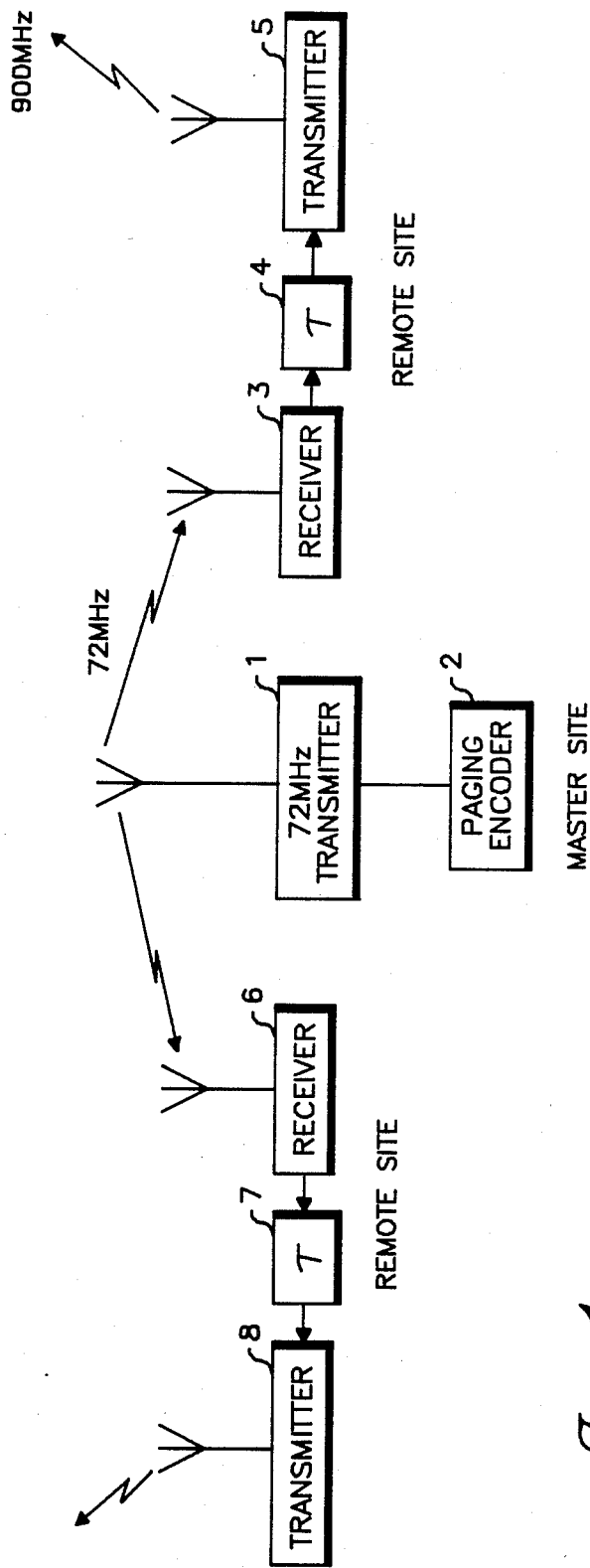
FIG. 1 is a block diagram of the improved simulcast system.

FIG. 1 is a block diagram of the improved simulcast system. The improved simulcast system consists of a central transmitter 1 which transmits a combination of voice and data signals generated by a paging encoder 2. The voice and data signals comprise a paging system transmission wherein the data signals comprise a unique paging address and the voice message constitutes a typical paging message. It should be noted that the invention is not limited to voice/data systems, but this type of transmission is the most difficult to process, and the combination of voice and data presents unique problems.

In one embodiment of the present invention, the signal generated by transmitter 1 is transmitted at 72 MHz. This signal is then received by remote receivers 3 and 6. The receivers 3 and 6 are phase-locked to the 72 MHz carrier which is used to provide a reference signal to remote transmitters 5 and 8. In addition, the receivers 3 and 6 derive the voice or data signal from the 72 MHz carrier.

The remote receivers are typically located at a great distance from each other and, therefore, delay circuits 4 and 7 are used to compensate for the difference in propagation times for the carrier signal. Simulcast systems require substantially identical modulation in the remote transmitters, and propagation delays in the received carrier signals would result in a distorted signal delivered to the paging signal due to a phase differential in the transmitted signals. The delays in the carrier signal are, therefore, compensated by delay devices 4 and 7.

The processed signals are then delivered to transmitters 5 and 8 which provide wide area coverage with a suitable transmission frequency, say, 900 MHz.

Figure 2:
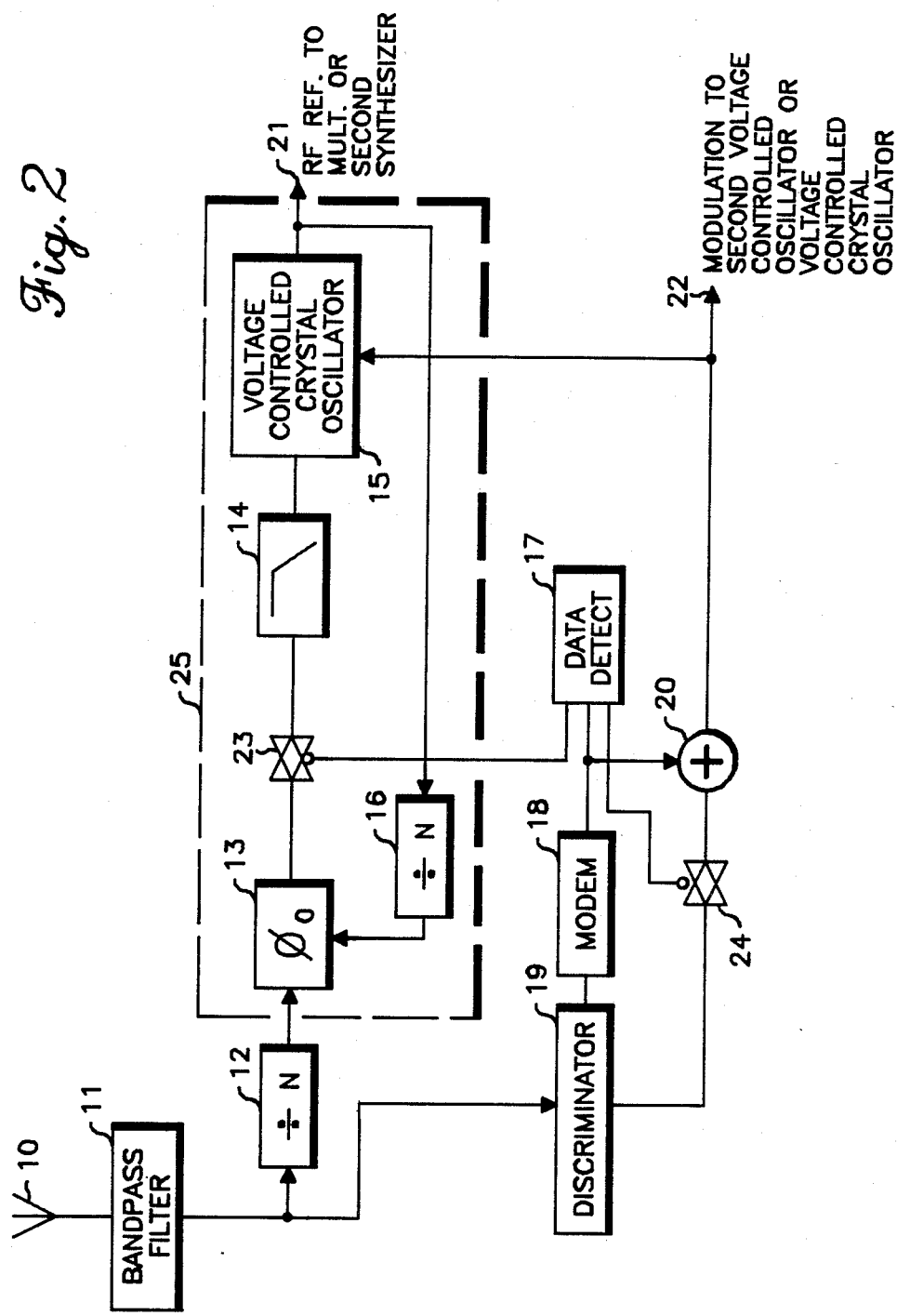
FIG. 2 is a block diagram of the remote receiver and a portion of the transmitter configured to process AFSK data or audio in the improved simulcast system.

FIG. 2 shows a block diagram of the receiver and transmitter circuit which may be utilized at the remote site of the system. The circuit of FIG. 2 comprises a conventional antenna 10 coupled to a frequency selector or a band pass filter 11. The frequency selector 11 is then coupled to a frequency divider 12 which divides the signal and couples the same to a phase detector 13 and a discriminator 19. Phase detector 13 is coupled to an electronic switch 23 which in turn is coupled to a low pass filter 14 and a data detector 17. The low pass filter 14 feeds one input of voltage-controlled crystal oscillator 15, the output of which is connected to a terminal 21 and a frequency divider 16. The output of divider 16 is coupled to the phase detector 13.

The discriminator 19 feeds a modem 18 and which is coupled to a summing network 20 and also to a data detector 17.

Phase detector 13, low pass filter 14, VCXO 15, and frequency divider 16 together form a standard phase-locked loop 25 (shown in dotted line) which will be readily appreciated by one skilled in the art.

In operation, a signal, say, for example, 72 MHz, is transmitted by the master station. This signal is received and selected by the antenna 10 and the frequency selector 11. The frequency divider 12 divides the received 72 MHz signal to an intermediate signal, say, 20 KHZ, which is used as the reference frequency for the phase detector 13 and is also applied to the discriminator 19.

The phase-locked loop 25 is designed to operate at the reference frequency, in this case, 20 KHZ, and provides a phase-locked signal to terminal 21. Discriminator 19 recovers the transmitted voice signal or the modulated data signal. The modulated data signal is then applied to a modulator-demodulator circuit which converts the modulated data signal to a binary form. The binary is then applied to a data detector 17 which generates an output which controls electronic switches 23 and 24. If data is present at the output of the discriminator 19 and modem 18, the voice path to the summing network 20 will be opened. In the presence of voice, the modem will not produce an output and the voice signal will be applied to the summing network 20.

This configuration has been found to provide satisfactory operation when a master transmitter is configured to transmit an AFSK signal, but the remote transmitters must retransmit FSK to the paging receivers. Paging address codes typically contain a dispartity of ones and zeros, and, therefore, the data signal could contain a DC (offset) component which will then drive the phase-locked loop off-frequency.

On the other hand, the frequency stability requirements of a simulcast system can be relaxed in the presence of data, and, therefore, the data detector is used to open the phase-locked loop in the presence of data, thereby preventing a frequency shift in the VCXO due to the correcting of the PLL. The phase-locked loop is then relocked when voice is present. The output frequency of the phase-locked loop will not drift if the PLL is open as the loop filter will maintain a DC voltage at the input of the voltage controlled oscillator. However, the PLL will not be able to correct the VCO frequency in the presence of data.

The output of the phase-locked loop 25 then provides a reference frequency which is used to drive a frequency synthesizer or multiplier. The combined audio and data signals appear at terminal 22 and are used to directly modulate the frequency synthesizer of the associated transmitter (not shown), thus providing a FSK transmission signal which is phase-locked to the original (72 MHZ) signal in the presence of voice. The transmitter frequency synthesizer will be discussed in some detail subsequently.

Figure 3:
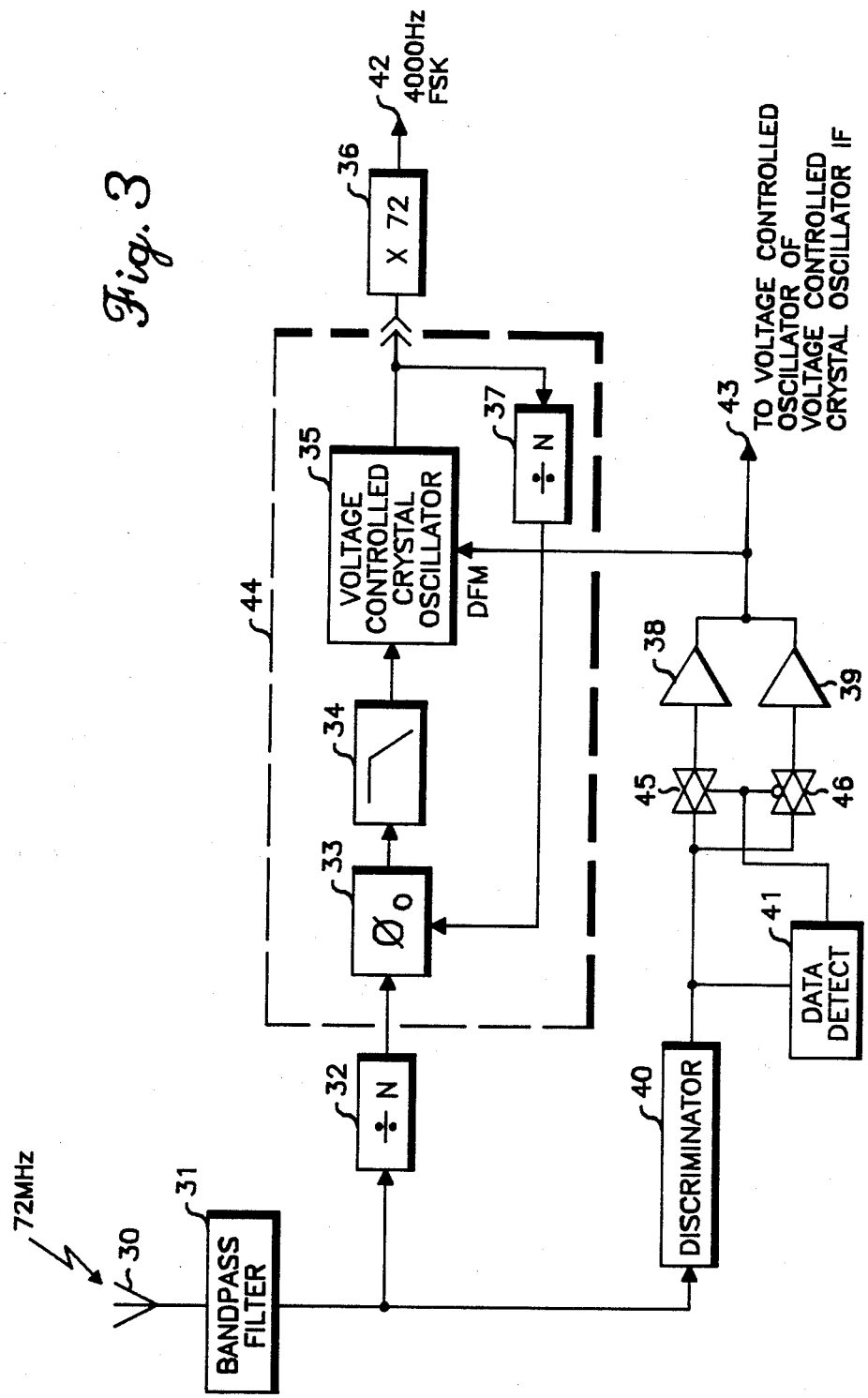
FIG. 3 is a block diagram of the remote receiver and a portion of the transmitter configured to process FSK data or audio in the improved simulcast system.

FIG. 3 is a block diagram of the remote receiver and transmitter configured to process FSK data and/or audio in the improved simulcast system. The circuit comprises an antenna 30 which is coupled to a frequency selector or band pass filter 31. The frequency selector 31 is coupled to a frequency divider 32 and a discriminator 40. The frequency divider 32 is coupled to a phase detector 33 which is coupled to a low pass filter 34. The low pass filter 34 is then coupled to a voltage-controlled oscillator 35. The voltage-controlled oscillator 35 is coupled to a frequency multiplier 36 and a frequency divider 37. The frequency divider 37 is then coupled to the phase detector 33. The phase detector 33, the low pass filter 34, the voltage-controlled oscillator 35 and the frequency divider 37 comprise a standard phase-locked loop 44 and will be readily apparent to one skilled in the art.

The discriminator 40 is coupled to a data detector 41 and electronic switches 45 and 46. The electronic switches 45 and 46 are coupled to amplifiers 38 and 39. The output of amplifiers 38 and 39 are connected to the voltage-controlled crystal oscillator 35 and to a terminal 43.

In operation, the received 72 MHz carrier signal is selected by the frequency selector 31. This signal is then divided by divider 32 and used as a reference signal for the phase-locked loop 44 which provides a phase-locked reference frequency for the frequency multiplier 36 or a frequency synthesizer (not shown).

The FSK data signal can be recovered from the 72 MHz link via discriminator 40 and reapplied directly to the modulation input of the crystal oscillator 35. However, if the FSK signal is transmitted down the 72 MHz link, then the residual D.C. component due to bit polarity disparity present in the paging address will be present on the 72 MHz reference used to phase lock the crystal oscillator. Moreover, a frequency offset will be multiplied by the frequency processing components after the crystal oscillator. The multiplication factor is the retransmitted output frequency, 930 MHz, divided by the 72 MHz input frequency, approximately 930/72=12.9.

A solution to this problem is to transmit the FSK signal on the 72 MHz link at a reduced deviation equal to the inverse of the circuit multiplication factor of 72/930. Thus, a 4000 Hz deviation of a FSK signal would be transmitted via the 72 MHz link at 310 Hz. The inherent system multiplication would retransmit this signal at the normal 4000 Hz level.

To transmit the bit-by-bit transmissions, the FSK signal recovered from the discriminator 40 must be reapplied to the VCXO at the proper level for 4000 Hz deviation. This is accomplished by the data detector 41, the electronic switches 45 and 46 and the amplifiers 38 and 39. In the presence of data, the data detector 41 will switch the output of the discriminator 40 to amplifier 38. This amplifier 38 is adjusted to compensate the data signal so that the signal will modulate the voltage-controlled oscillator 35 at the proper deviation level. The amplifier 38 gain would be set for the inverse of the system multiplication factor or 930/72.

In the presence of voice, the data detector 41 will switch the output of the discriminator 40 to amplifier 39 which is adjusted to operate with unity gain. A voice signal would be processed in a manner identical to the circuit of FIG. 2.

Figure 4:
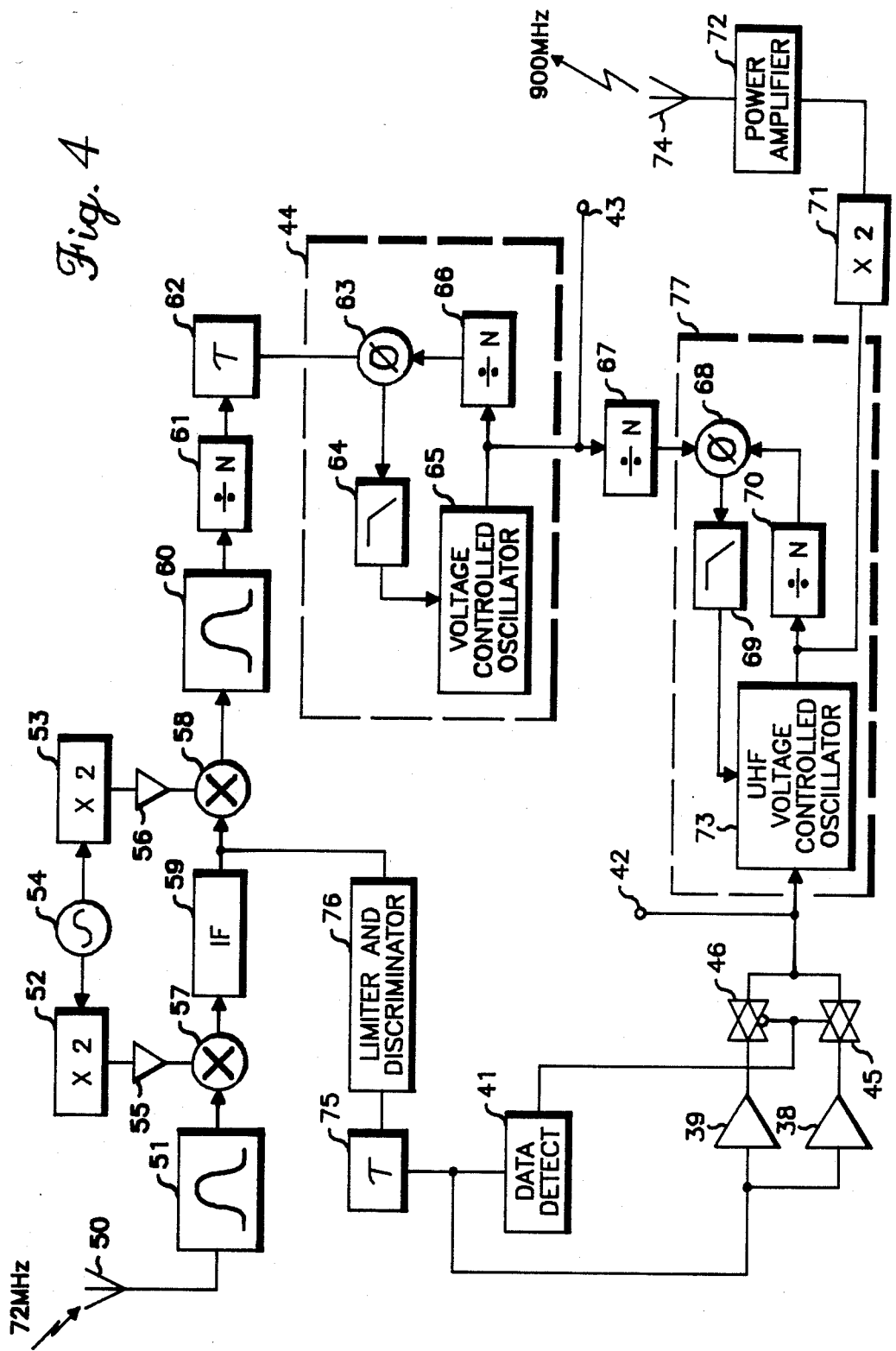
FIG. 4 is a more-detailed block diagram of the circuit of FIG. 3.

FIG. 4 is a more detailed block diagram of the circuit of FIG. 3. The block diagram shows a complete receiver and transmitter which would be used at a remote site to receive FSK data, at reduced deviation, and voice and retransmit FSK data, at full deviation, and voice.

The remote station comprises an antenna 50 coupled to a bandpass filter 51. The bandpass filter 51 is coupled to a mixer 57 which is coupled to an IF amplifier and filter 59. The IF amplifier and filter 59 is coupled to a mixer 58. An oscillator 54 is coupled to frequency multipliers 52 and 53 which are then coupled to amplifiers 55 and 56, respectively. The amplifiers 55 and 56 are coupled to mixers 57 and 58, respectively.

In operation, the incoming signal is selected by bandpass filter 51 and is then mixed with the signal of oscillator 54. This converts the incoming 72 MHz signal to a lower IF frequency. This IF signal is then connected to the limiter/discriminator 76. In addition, the signal is connected to mixer 58 which reconverts the IF signal to a frequency of 72 MHz for further processing.

The mixers 57 and 58 are connected to a single oscillator 54. This technique insures that any frequency drift or instability in oscillator 54 will be completely cancelled by the dual mixers 57 and 58.

In the preferred embodiment, the oscillator 54 would operate at approximately 33.37 MHz to provide an IF frequency of 5.26 MHz.

The output of mixer 58 is connected to a bandpass filter 60 which removes the side band signals from the modulated 72 MHz signal. This output of bandpass filter 60 is connected to an electronic divider 61 which converts the 72 MHz signal to the 20 kHz reference signal used by the phase-locked loop. The divider 61 would be configured to operate with a divide ratio of 3601.

The output of divider 61 is connected to a delay device 62. The delay 62 compensates for propagation delay differentials which occur in the transmission of the 72 MHz signal to the various remote stations.

The delay device 62 is connected to the phase detector 63. The phase detector 63, the low-pass filter 64, the voltage-controlled oscillator 65 and the electronic divider 66 form a phase-locked loop 44 and are enclosed by a dashed line to enhance comparison with FIG. 3. The phase-locked loop provides a signal which is phase locked with the 72 MHz input signal. The voltage-controlled oscillator for this circuit is designed to operate at 14.4 MHz, and the electronic divider 66 provides a divide ratio of 720 to provide a second 20 kHz input to phase detector 63. The output of divider 66 is connected to a second frequency divider 67. This divider provides a reference frequency to a second phase-locked loop which is used to synthesize the retransmission frequency. The divider 67 provides a divide ratio of 2304 which generates a reference frequency of 6.25 kHz.

The phase detector 68, the low pass filter 69, the UHF voltage-controlled oscillator 73 and the divider 70 form a second phase-locked loop which is phase locked to the 72 MHz carrier through the phase-locked loop 44. The UHF voltage-controlled oscillator is designed to operate at approximately 450 MHz, and the divider 70 provides a divide ratio of approximately 74321 to provide a second 6.25 kHz input to phase detector 63. It should be noted that the natural frequency of the second phase-locked loop 77 is lower than the first phase-locked loop 44 to allow the low frequency components of the FSK signal to propagate through the phase-locked loop 44 and phase detector 68.

The output of the UHF voltage-controlled oscillator is connected to a frequency doubler 71 which converts the 450 MHz signal to a 900 MHz signal used for transmission. The output of frequency multiplier 71 is connected to power amplifier 72 which amplifies the 900 MHz signal to a level suitable for transmission.

It should be noted that the divide and multiply ratios outlined in this discussion are calculated to provide a specific transmission frequency. In practice, these dividers and multipliers would be programmable devices which could be configured to provide any transmission frequency required by the system.

The voice and data signals for the circuit are recovered by the limiter/discriminator 76. The limiter discriminator is connected to a delay device 75 which provides the same function as delay device 62. The audio or voice signals are then connected to amplifiers 38 and 39 and to the data detector 41.

In the presence of data, the data detector will activate electronic switch 45 which will connect the output of amplifier 38 of the UHF voltage-controlled oscillator modulation input. In the presence of voice, electronic switch 46 will be activated, and amplifier 39 will be connected to the modulation input of the UHF voltage-controlled oscillator thus providing a modulation signal to the synthesizer circuit.

The foregoing embodiments have been intended as illustrations of the principles of the present invention.

Accordingly, other modifications, uses and embodiments will be apparent to one skilled in the art without departing from the spirit and scope of the principles of the present invention.

What is claimed is:

1. An improved simulcast transmission system having a master transmitter and a plurality of phase-locked remote receiver and simulcast transmitter units wherein a transmitted carrier signal provides a reference signal for the simulcast transmitters used at the remote transmitter sites to distribute a simulcast signal, comprising:
   means for receiving a carrier signal;
   phase-locked loop means including a first electronic switch means for phase locking to the received carrier signal and providing a phase-locked reference signal to said remote simulcast transmitters, wherein said first electronic switch means opens the phase-locked loop in response to a signal;
   discriminator means coupled to said receiving means for recovering a base-band signal of audio and encoded data;
   modem means coupled to said discriminator means to recover the data signal from said modem means comprising the base-band signal;
   data detector means coupled to said modem means and said first electronic switch means, to sense the presence of data, and activate or deactivate said first electronic switch;

a second electronic switch means coupled to said discriminator means and responsive to said data detector means to block the audio signal in the presence of data; and summing network means coupled to said modem means and to said second electronic switch means for providing a modulation signal to the remote transmitters comprising the combined audio and data signals.

2. An improved simulcast transmission system having a master transmitter, which transmits modulated audio and frequency-shifted keying (FSK) data at reduced deviation and a plurality of phase-locked remote receiver and simulcast transmitter units utilizing a transmitted carrier signal for providing a reference signal for the phase-locked loop receivers and simulcast transmitters used at the remote sites comprising;

means for receiving a carrier signal;

phase-locked means for phase locking to the received carrier signal for providing a radio frequency (RF) reference signal to said simulcast remote transmitters;

discriminator means coupled to said receiving means for recovering the audio or modulated data signal;

data detector means coupled to said discriminator means for sensing the presence of FSK data;

first electronic switch means coupled to said discriminator means responsive to said for controlling the audio signal;

second electronic switch means coupled to said discriminator means and responsive to said data detector means for controlling the data signal;

a first amplifier means coupled to said first electronic switch means for compensating the FSK signal level;

a second amplifier means coupled to said second electronic switch means for compensating the FSK signal level; and the output of first amplifier means coupled to the output of said second amplifier means providing a modulation signal to the volatage controlled oscillator of said phase-locked loop means.

3. The apparatus of claim 1 wherein the receiving means includes a bandpass filter and a frequency divider.

4. The apparatus of claim 1 wherein the modem is configured to decode audio frequency-shifted keying (AFSK) data.

5. The apparatus of claim 1 wherein said phase locked loop includes a phase detector, a low pass filter, a voltage controlled crystal oscillator and an electronic switch.

6. The apparatus of claim 2 wherein the receiving means includes a bandpass filter and a frequency divider.

7. The apparatus of claim 2 wherein the amplifier in the audio path is configured to compensate the audio signal for unity gain through the receiver circuitry.

8. The apparatus of claim 2 wherein the amplifier in the data path is configured to provide a gain which is the inverse of the phase locked loop multiplication factor.

9. The apparatus of claim 2 wherein said phase locked loop includes a phase detector, a low pass filter, and a voltage controlled oscillator.

10. An improved method for simulcast transmission including the steps of:

receiving a transmitted carrier signal;

phase locking to the received carrier signal and providing a phase locked radio frequency (RF) reference signal to the remote transmitters by a phase locked loop including a voltage controlled oscillator;

recovering a base-band signal of audio and encoded data from a carrier signal;

recovering the data signal from the base-band signal;

detecting the presence of data;

opening the phase locked loop in the presence of data;

blocking the audio signal in the presence of data;

summing the audio and the recovered data signal; and directly modulating the voltage controlled oscillator with the combined audio and data signal.

11. An improved method for simulcast transmission in a system having a master transmitter, a plurality of receivers and a plurality of remote simulcast transmitters coupled to said receivers including the steps of:

receiving, with a receiver, a transmitted carrier signal transmitted from said master transmitter, said transmitted carrier signal being modulated with an audio or data signal;

phase locking to the received carrier signal and providing a phase locked radio frequency (RF) reference signal to the remote simulcast transmitters;

recovering the audio or modulated data signal with a first phase locked loop;

sensing the presence of frequency-shifted keying (FSK) data or audio;

blocking the audio signal in the presence of data;

blocking the data signal in the presence of audio;

compensating the audio signal level for unity gain through the receiver circuitry;

compensating the data signal modulation level to a level equal to the inverse of the multiplication ratio of the phase locked loop;

combining the compensated audio and compensated data signals; and directly modulating a second voltage controlled crystal oscillator of the second phase locked loop with combined audio and data signal wherein the output of said second phase locked loop is directly multiplied and amplified to provide said simulcast transmission signal.

* * * * *